Aug. 25, 1959     P. A. CAVETT ET AL     2,901,008

FUELING SYSTEM

Filed Feb. 21, 1958     3 Sheets-Sheet 1

INVENTORS
Paul A. Cavett,
BY Preston O. Robards,

Robert R. Lockwood
ATTY

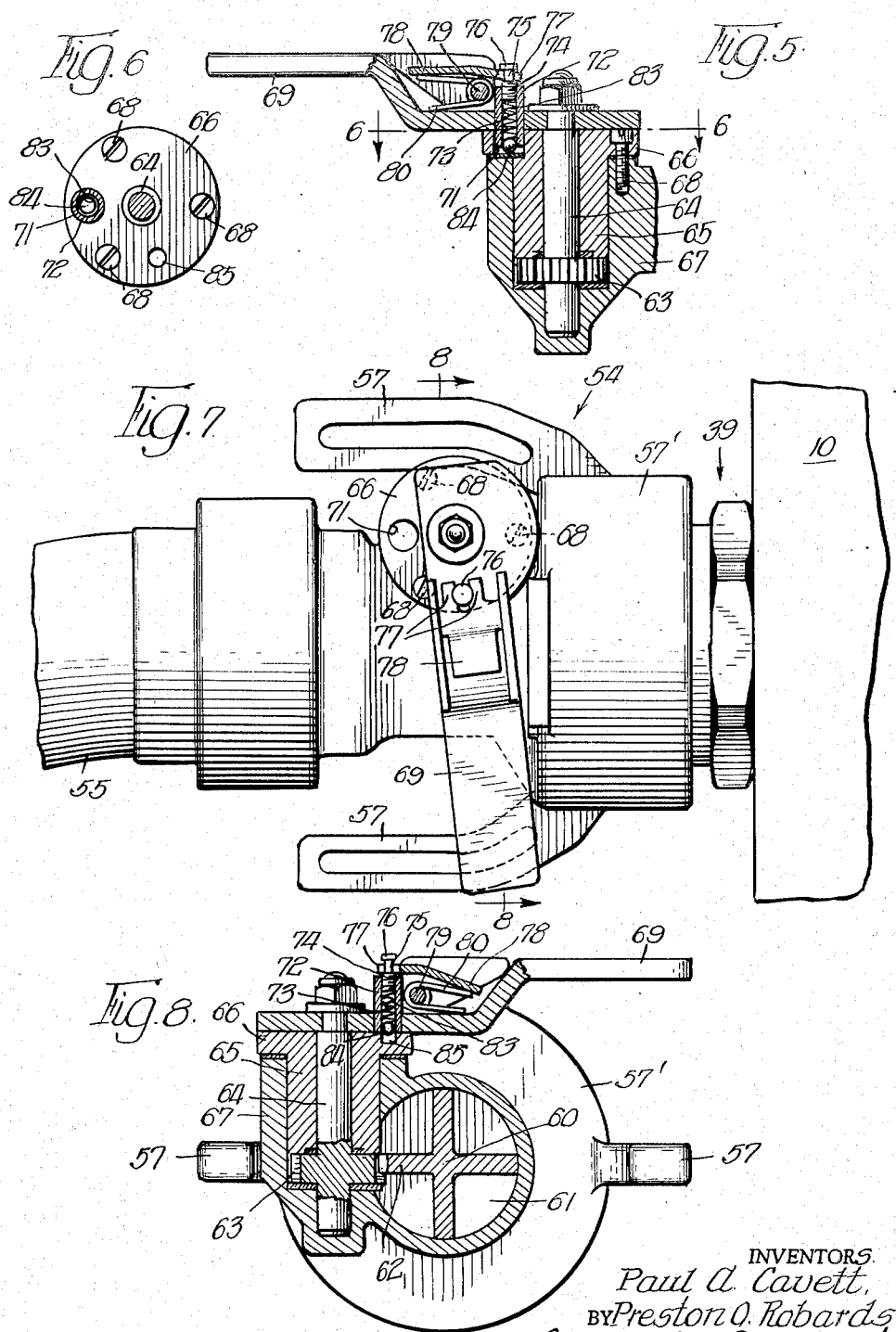

United States Patent Office 2,901,008
Patented Aug. 25, 1959

2,901,008

FUELING SYSTEM

Paul A. Cavett, Evanston, and Preston O. Robards, Chicago, Ill., assignors to Equipment Research Corporation, Chicago, Ill., a corporation of Illinois Application February 21, 1958, Serial No. 716,681

7 Claims. (Cl. 141—207)

This invention relates, generally, to fueling systems and it has particular relation to systems for supplying fuel to locomotives, such as liquid fuel or fuel oil to diesel locomotives. However, it can be used for supplying fuel to trucks, aircraft, and the like.

Among the objects of this invention are: To automatically shut off the flow of fuel when the fuel tank has been filled to a predetermined level; to hold a valve in a nipple connected to the fuel tank and a valve in a nozzle detachably connected to the nipple in open positions against the closing force of a spring and to apply air pressure to close the valves automatically when the fuel in the tank reaches a predetermined level; to lock the valves in the nozzle in the closed position on automatic closure thereof; and to provide a handle for manually operating the valves and to hold the handle in the open position against the biasing action of the spring and to lock it in the closed position.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 5 is a sectional view taken generally along the line 5—5 of Figure 2 and showing the handle in the position corresponding to the closed position of the valves;

Figure 6 is a sectional view taken generally along the line 6—6 of Figure 5 and showing the arrangement of the top plate portion of the bushing in which the shaft carrying the handle is rotatably mounted;

Figure 7 is a view, similar to Figure 2, but showing the handle in the position corresponding to the open position of the valves; and Figure 8 is a sectional view taken generally along the line 8—8 of Figure 7.

Figure 1:
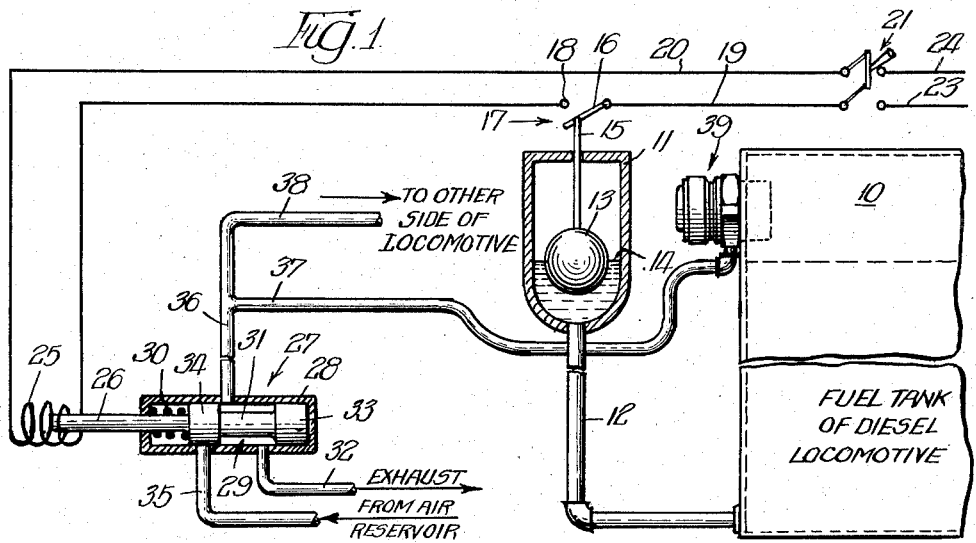
Figure 1 illustrates somewhat diagrammatically a portion of the refueling system embodying the present invention, the apparatus there shown being mounted on the diesel locomotive.

Referring to Figure 1 of the drawings, it will be observed that the reference character 10 designates, generally, a fuel tank which may be located on a diesel locomotive. Suitably mounted on the locomotive is a float chamber 11 which is connected by a conduit 12 to the fuel tank 10. Within the float chamber 11 there is a float 13 which is responsive to the fuel level 14 as it is maintained in the float chamber 11. Extending from the float 13 is an operating rod 15 which is connected, as shown, to a movable contact 16 of a switch that is indicated, generally, at 17. The movable contact 16 is arranged to engage a fixed contact 18 when the fuel level 14 reaches a predetermined point with corresponding movement of the float 13. As a result of the closure of the switch 17 a sequence of operations is initiated, to be described in detail hereinafter, which automatically causes the stoppage of further flow of fuel to the tank 10.

The switch 17 is interposed in a conductor 19 which has associated therewith another conductor 20 and both are connected through a double pole switch, shown generally at 21, to a source of electric current, such as the battery on the locomotive which is represented by the conductors 23 and 24. This source may be a 64 volt source.

The conductors 19 and 20 are connected to energize a winding 25 having an armature 26 associated therewith which is employed for controlling the operation of an air valve that is shown, generally, at 27. The air valve 27 includes a housing 28 within which a valve member, shown generally at 29, is slidably mounted and is biased in one direction by a coil compression spring 30. On energization of the winding 25, the valve member 29 is moved to the left against the biasing action of the spring 30. The valve member 29 has a central reduced diameter section 31 which is normally in communication with an exhaust conduit 32. Also the valve member 29 has valve sections 33 and 34 at its ends. The valve section 33 is employed, when the valve member 29 is operated to the left on energization of the winding 25 to close off the exhaust conduit 32. The valve section 34 controls the flow of air from the air reservoir on the locomotive through a conduit 35. It will be observed that a conduit 36 is connected to the valve housing 28 and that it always is in communication with the space defined by the reduced diameter section 31 of the valve member 29. Thus the conduit 36 either is connected to the exhaust conduit 32 when the valve member 29 is in the position shown or, when the winding 25 is energized and the valve member 29 is moved to the left, the conduit 36 is connected to the conduit 35 while the conduit 32 is closed off by the valve section 33. This permits compressed air to flow through the conduit 36 and through one or the other of branches 37 or 38 which are connected to refueling nipples on opposite sides of the locomotive, one of these nipples being shown, generally, at 39.

Figure 3:
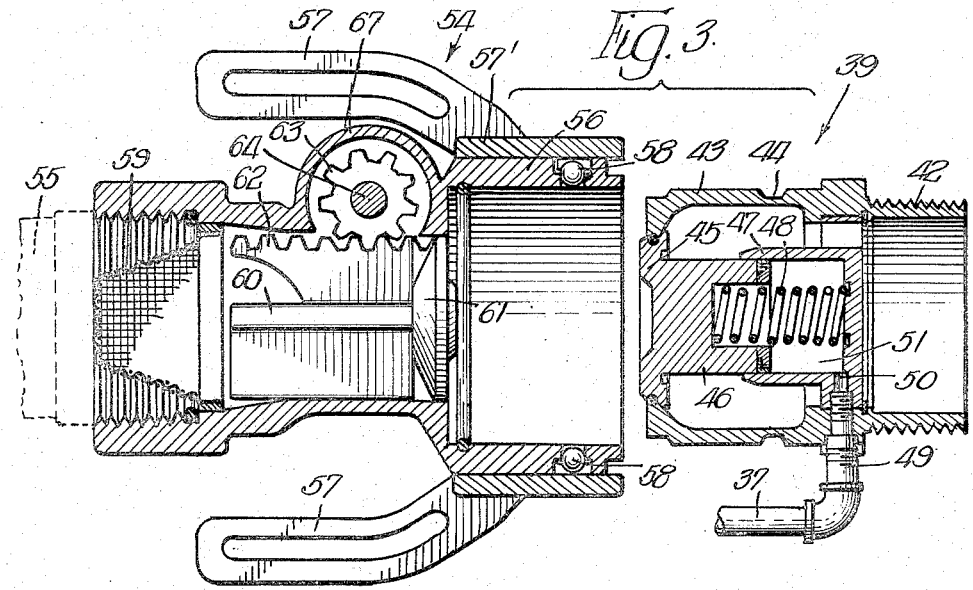
Figure 3 is a longitudinal sectional view through the nipple and nozzle, the latter being shown in slightly spaced relation from the former.

Figure 3 of the drawings shows more clearly the details of construction of the refueling nipple 39. At one end it is provided with a threaded section 42 by means of which it is mounted on the fuel tank 10. At the opposite end there is a cylindrical nozzle attaching section 43 which is provided with an annular groove 44 the purpose of which will be apparent presently. The passageway through the nipple 39 is normally closed by a fuel valve 45 which is mounted on a piston 46 that is slidable within a cylinder 47 that is mounted centrally of the nipple 39. A coil compression spring 48 within the cylinder 47 acts to bias the piston 46 and thereby the fuel valve 45 outwardly to the closed position.

It is desirable to provide for actuating the piston 46 outwardly by means of compressed air. For this purpose a fitting 49 is employed which is arranged to be connected to the branch 37 of the conduit 36. The compressed air can flow through the fitting 49 and a passageway 50 into the interior 51 of the cylinder 47. As will be described hereinafter, during the refueling operation, the fuel valve 45 is held in the open position against the biasing action of the spring 48. When the fuel level reaches a predetermined point, compressed air is permitted to flow through the conduit 36, branch 37 and passageway 50 into the interior 51 of the cylinder 47. This causes the piston 46 to move outwardly and to move the fuel valve 45 to the closed position.

Figure 4:
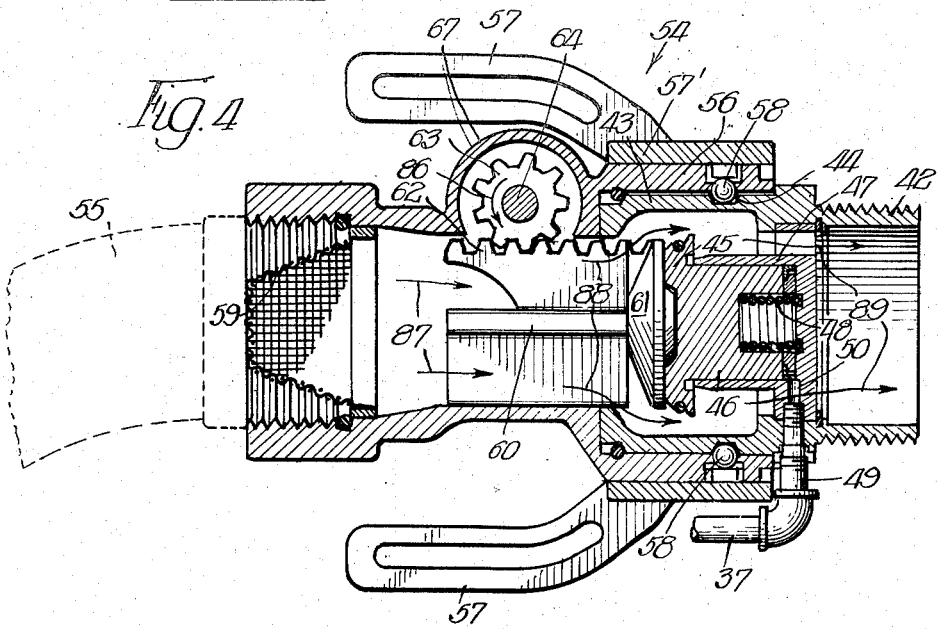
Figure 4 is a view, similar to Figure 3, but showing the nozzle clamped to the nipple in operative position and the valves in the open position permitting the fuel to flow from the high pressure source into the fuel tank on the locomotive.

The fuel is supplied to the refueling nipple 39 through a nozzle that is indicated, generally, at 54. The nozzle 54 is arranged to be detachably connected to the nipple 39. The details of construction are shown more clearly in Figure 3. There it will be observed that the nozzle 54 is connected to one end of a flexible fueling hose 55 that is connected at its other end to a source of fuel under pressure. At the opposite end the nozzle 54 has a cylindrical end portion 56 that is arranged to telescope over the cylindrical nozzle attaching section 43 of the nipple 39 as shown in Figure 4. Handles 57 extend from a sleeve portion 57' of the nozzle 54 and are arranged to move locking balls 58 from retracted positions, shown in Figure 3, into the annular groove 54 as shown in Figure 4 for the purpose of securely locking the nozzle 54 onto the refueling nipple 39. In order to prevent the flow of solids through the nozzle 54, a screen 59 is located over the intake end as shown in Figures 3 and 4.

Figure 2:
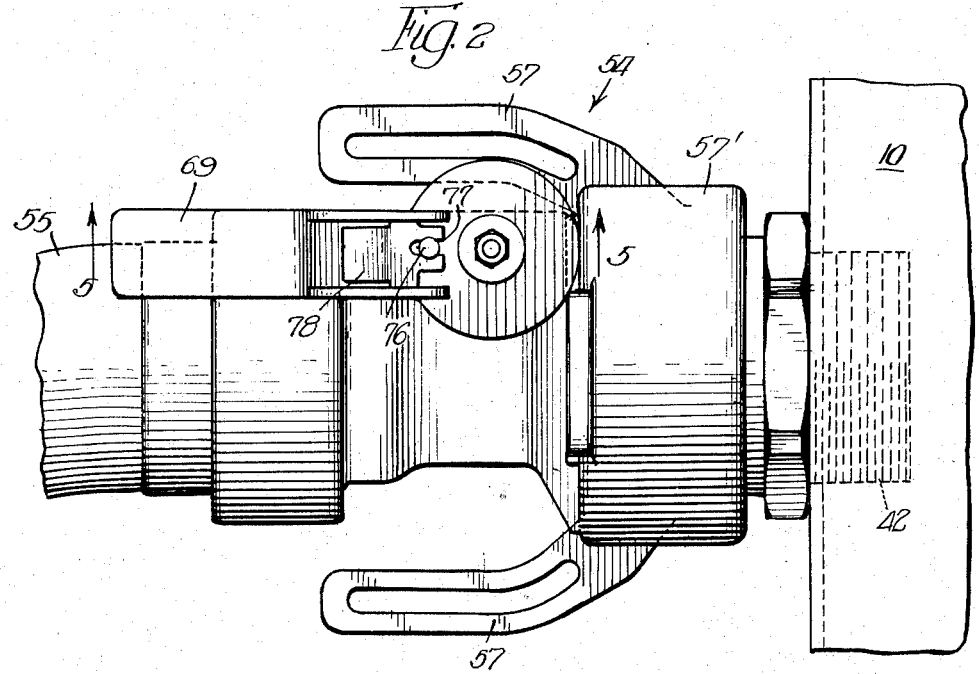
Figure 2 is a top plan view of the nozzle which is attached to a fueling hose and is mounted in fueling position on the nipple, the valves in the nipple and nozzle being closed.

Slidably mounted within the body of the nozzle 54 is a valve support 60 which carries a fuel valve 61 at its righthand end. In the retracted position as shown in Figure 3, the fuel valve 61 prevents the flow of fuel from the fueling hose 55. In order to open the fuel valve 61 a rack 62 is mounted on one branch of the valve support 60 and it is engaged by a pinion 63 which is non-rotatably mounted on a shaft 64. The shaft 64 is journaled in a bushing 65, Figure 5, which has a top plate portion or head 66 that is shown more clearly in Figure 6 of the drawings. The bushing 65 and top plate portion or head 66 are secured to the body 67 of the nozzle 54 by means of screws 68. As shown in Figure 6 there are three screws 68 which project through suitable openings in the top plate portion or head 66. Non-rotatably mounted on the upper end of the shaft 64 is a handle 69 which can be manually operated from a position corresponding to the closed positions of the fuel valves 45 and 61, as shown in Figure 2, to the open positions thereof as shown in Figure 7.

It is desirable to automatically lock the handle 69 in the position corresponding to the closed positions of the valves 45 and 61. For this purpose a large diameter opening 71 is provided in the top plate portion or head 66 of the bushing 65. It is arranged to receive a cylindrical detent 72 which is slidable through an opening 73 in the handle 69. At its upper end the cylindrical detent 72 is provided with a threaded plug 74 which has a reduced diameter section 75 underneath a head 76 for receiving the bifurcated end 77, Figures 2 and 7 of the drawings, of a latch release lever 78 that is rockably mounted on a pin 79 which extends transversely of the handle 69. A spring 80 reacts between the handle 69 and the latch release lever 78 to bias the cylindrical detent 72 to the locked position shown in Figure 5.

While it is desirable to provide for holding the fuel valves 45 and 61 in the open position, they are not positively locked in this position since it is desirable that they be closed automatically when the fuel in the tank 10 reaches a predetermined level. Accordingly, the cylindrical detent 72 has positioned therein a coil compression spring 83 which bears against a ball detent 84 that is arranged to interfit with a small diameter opening 85 in the upper side of the top plate portion or head 66 as shown in Figure 6. It will be observed that the small diameter opening 85 is spaced arcuately from the large diameter opening 71 to an extent corresponding to the arcuate movement of the handle 69 in moving the fuel valve 61 from the closed position, shown in Figures 2 and 3 of the drawings, to the open position as shown in Figures 4 and 7 of the drawings.

In describing the operation of the refuling system disclosed herein it will be assumed that the level of the fuel in the tank 10 is at or below the level indicated at 14 and that the switch 21 is closed. Also it will be assumed that the conduit 35 is supplied with air under pressure from the air reservoir and that the air valve 27 is closed, the winding 25 being deenergized. Under these conditions the fuel valve 45 in the refueling nipple 39 is closed as illustrated in Figure 3 of the drawings.

The nozzle 54 is placed in registry with the refueling nipple 39, as shown in Figure 3, with the locking balls 58 retracted. Next the nozzle 54 is telescoped over the nipple 39 and the handles 57 are rotated to move the locking balls 58 inwardly into locking engagement with annular groove 44. When the nozzle 54 is positioned as just described, the fuel valve 61 is juxtaposed to the fuel valve 45.

Next the operator depresses the latch release lever 78 on the handle 69. This movement of the latch release lever 78 withdraws the cylindrical detent 72 from the large diameter opening 71 in the top plate portion or head 66 and frees the lever 69 for rotation to a position corresponding to the open positions of the fuel valves 45 and 61. As the handle 69 is swung toward the open position, the pinion 63 is rotated in the direction indicated by the arrow 86 in Figure 4 to move the rack 62 and therewith the valve support 60 to the right carrying with them the fuel valve 61. Since the fuel valve 61 is juxtaposed to the fuel valve 45, conjoint movement of the fuel valves 45 and 61 is thus effected against the biasing action of the spring 48 which is compressed to the position shown in Figure 4. The fuel is then permitted to flow in the direction indicated by the arrows 87 and 88 through the nozzle 54 and in the direction indicated by the arrows 89 through the nipple 39 into the fuel tank 10.

In the full open position of the handle 69, as shown in Figure 8, the ball detent 84 engages the small diameter opening 85 and thus holds the fuel valves 45 and 61 in the open position.

Now, when the level 14 in the fuel tank 10 rises to such a position that the float 13 causes the switch 17 to be closed, the winding 25 is energized, the valve member 29 is moved to the left and air pressure is applied through the conduit 36 and branch 37 to the interior 51 of the cylinder 47. The air pressure thus applied to the piston 46 is sufficient to overcome the holding effect of the ball detent 84 and the fuel valves 45 and 61 are forced to the closed positions accompanied by rotation of the pinion 63 and shaft 64. This carries with it the handle 69 and finally it reaches the position corresponding to the closed positions of the fuel valves 45 and 61 where the cylindrical detent 72 is in registry with the large diameter opening 71 in the top plate portion or head 66. The spring 80 then automatically moves the cylindrical detent 72 into the large diameter opening 71 and securely locks the lever 69 in the closed position.

Now the operator can grasp the handles 57 and rotate the sleeve 57' to permit withdrawal of the locking balls 58 from the annular groove 44 and subsequent detachment of the nozzle 54 from the nipple 39.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A system for automatically shutting off the flow of liquid fuel from a source of the same under pressure to a locomotive having a source of air pressure comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement, a conduit opening into said cylinder and connected to said source of air pressure, an air valve interposed in said conduit, a float chamber connected to said fuel tank, a float in said float chamber, and means operatively interconnecting said float and said air valve when the fuel in said tank reaches a predetermined level to open said air valve and apply air pressure to said cylinder whereupon said piston moves outwardly to close said fuel valves.

2. A system for automatically shutting off the flow of liquid fuel from a source of the same under pressure to a locomotive having a source of air pressure comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a handle rotation of which effects movement of said fuel valves conjointly to open position, a conduit opening into said cylinder and connected to said source of air pressure, an air valve interposed in said conduit, a float chamber connected to said fuel tank, a float in said float chamber, and means operatively interconnecting said float and said air valve when the fuel in said tank reaches a predetermined level to open said air valve and apply air pressure to said cylinder whereupon said piston moves outwardly to close said fuel valves and to rotate said handle to said closed position.

3. A system for automatically shutting off the flow of liquid fuel from a source of the same under pressure to a locomotive having a source of air pressure comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder and biased by a spring to closed position, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a handle rotation of which effects movement of said fuel valves conjointly to open position, means on said nozzle cooperating with said handle to lock it in closed position, means on said handle to hold the same and fuel valves in said open position against the biasing action of said spring, a conduit opening into said cylinder and connected to said source of air pressure, an air valve interposed in said conduit, a float chamber connected to said fuel tank, a float in said float chamber, and means operatively interconnecting said float and said air valve when the fuel in said tank reaches a predetermined level to open said air valve and apply air pressure to said cylinder whereupon said piston moves outwardly to close said fuel valves and to rotate said handle to said closed position.

4. A system for automatically shutting off the flow of liquid fuel from a source of the same under pressure to a locomotive having a source of air pressure comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder and biased by a spring to closed position, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a rack connected to the fuel valve in said nozzle and engaged by a pinion rotatably mounted on said nozzle and having a handle connected thereto, rotation of said handle and therewith said pinion effecting movement of said rack to operate said fuel valves conjointly to open position, plate means on said nozzle underlying said handle and having a relatively large opening and a relatively small opening therein in arcuate spaced relation corresponding respectively to the closed and open positions of said fuel valves and of said handle, a cylindrical detent slidably carried by said handle and biased into said relatively large opening to lock said handle in said closed position, manually operable means carried by said handle and connected to said cylindrical detent for disengaging the same from said relatively large opening, a ball detent carried by said cylindrical detent and biased into readily removable relation with said relatively small opening to hold said handle and fuel valves in said open position against the biasing action of said spring, a conduit opening into said cylinder and connected to said source of air pressure, an air valve interposed in said conduit, a float chamber connected to said fuel tank, a float in said float chamber, and means operatively interconnecting said float and said air valve when the fuel in said tank reaches a predetermined level to open said air valve and apply air pressure to said cylinder whereupon said piston moves outwardly to close said fuel valves and to rotate said handle to said closed position.

5. A system for automatically shutting off the flow of liquid fuel from a source of the same under pressure to a locomotive having a source of air pressure and a source of electric current comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder and biased by a spring to closed position, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a handle rotation of which effects movement of said fuel valves conjointly to open position, means on said nozzle cooperating with said handle to lock it in closed position, means on said handle to hold the same and said fuel valves in said open position against the biasing action of said spring, a conduit opening into said cylinder and connected to said source of air pressure, an air valve interposed in said conduit normally biased to closed position, electromagnetic means connected to said air valve including a winding connected for energization to said source of electric current, a float chamber connected to said fuel tank, a float in said float chamber, and a normally open switch controlled by said float and interposed between said source of electric current and said winding to energize the same when the fuel in said tank reaches a predetermined level to open said air valve and apply air pressure to said cylinder whereupon said piston moves outwardly to close said fuel valves and to rotate said handle to said closed position.

6. A system for automatically shutting off the flow of liquid fuel from a source of the same under pressure to a locomotive having a source of air pressure and a source of electric current comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder and biased by a spring to closed position, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a handle rotation of which effects movement of said fuel valves conjointly to open position, plate means on said nozzle underlying said handle and having a relatively large opening and a relatively small opening therein in arcuate spaced relation corresponding respectively to the closed and open positions of said fuel valves and of said handle, a cylindrical detent slidably carried by said handle and biased into said relatively large opening to lock said handle in said closed position, manually operable means carried by said handle and connected to said cylindrical detent for disengaging the same from said relatively large opening, a ball detent carried by said cylindrical detent and biased into readily removable relation with said relatively small opening to hold said handle and fuel valves in said open position against the biasing action of said spring, a conduit opening into said cylinder and connected to said source of air pressure, an air valve interposed in said conduit normally biased to closed position, electromagnetic means connected to said air valve including a winding connected for energization to said source of electric current, a float chamber connected to said fuel tank, a float in said float chamber, and a normally open switch controlled by said float and interposed between said source of electric current and said winding to energize the same when the fuel in said tank reaches a predetermined level to open said air valve and apply air pressure to said cylinder whereupon said piston moves outwardly to close said fuel valves and to rotate said handle to said closed position.

7. A system for automatically shutting off the flow of liquid fuel from a source of the same under pressure to a locomotive having a source of air pressure and a source of electric current comprising, in combination, a liquid fuel tank on the locomotive, a nipple providing a fuel inlet passageway to said fuel tank, a cylinder carried by said nipple, a fuel valve for closing said passageway, said fuel valve having a piston slidable in said cylinder and biased by a spring to closed position, a fueling hose for connection to said source of liquid fuel, a nozzle detachably connected to said nipple and mounted on one end of said fueling hose, a fuel valve in said nozzle for closing the opening therethrough and engaging said fuel valve in said nipple, manually operable means on said nozzle for opening said fuel valves when the same are in engagement including a rack connected to the fuel valve in said nozzle and engaged by a pinion rotatably mounted on said nozzle and having a handle connected thereto, rotation of said handle and therewith said pinion effecting movement of said rack to operate said fuel valves conjointly to open position, plate means on said nozzle underlying said handle and having a relatively large opening and a relatively small opening therein in arcuate spaced relation corresponding respectively to the closed and open positions of said fuel valves and of said handle, a cylindrical detent slidably carried by said handle and biased into said relatively large opening to lock said handle in said closed position, manually operable means carried by said handle and connected to said cylindrical detent for disengaging the same from said relatively large opening, a ball detent carried by said cylindrical detent and biased into readily removable relation with said relatively small opening to hold said handle and fuel valves in said open position against the biasing action of said spring, a conduit opening into said cylinder and connected to said source of air pressure, an air valve interposed in said conduit normally biased to closed position, electromagnetic means connected to said air valve including a winding connected for energization to said source of electric current, a float chamber connected to said fuel tank, a float in said float chamber, and a normally open switch controlled by said float and interposed between said source of electric current and said winding to energize the same when the fuel in said tank reaches a predetermined level to open said air valve and apply air pressure to said cylinder whereupon said piston moves outwardly to close said fuel valves and to rotate said handle to said closed position.

References Cited in the file of this patent
UNITED STATES PATENTS
2,837,350   Druge _____ June 3, 1958